United States Patent [19]
Leshik

[11] 4,038,694
[45] July 26, 1977

[54] PLAYER FOR TAPE CARTRIDGES AND CASSETTES

[75] Inventor: Edward Alexander Leshik, London, England

[73] Assignee: Hellermann Cassettes Limited, Crawley, England

[21] Appl. No.: 618,225

[22] Filed: Sept. 30, 1975

[30] Foreign Application Priority Data

Oct. 1, 1974 United Kingdom ............... 42549/74

[51] Int. Cl.² .............. G11B 21/22; G11B 21/24; G11B 5/56
[52] U.S. Cl. ..................... 360/105; 360/109
[58] Field of Search ................. 360/105, 109

[56] References Cited

U.S. PATENT DOCUMENTS

| | | | |
|---|---|---|---|
| 2,742,536 | 4/1956 | Uritis | 360/109 |
| 3,706,861 | 12/1972 | Giel | 360/105 |
| 3,729,202 | 4/1973 | Wakabayashi | 360/105 |
| 3,864,743 | 2/1975 | Staar | 360/105 |

Primary Examiner—Robert S. Tupper
Attorney, Agent, or Firm—Lawrence E. Laubscher

[57] ABSTRACT

A tape transport machine for feeding the tape of a tape cartridge or cassette includes a bridge member which carries a magnetic sensing head and a pressure wheel co-operating with a drive capstan to feed the tape. The bridge includes a one-piece synthetic plastic moulding which incorporates integral hinges, one for moving the bridge arcuately across the tape deck, a second for adjusting the angle of the sensing head relative to the plane of the deck and the third for adjusting the position of the pressure wheel towards and away from the cartridge.

14 Claims, 9 Drawing Figures

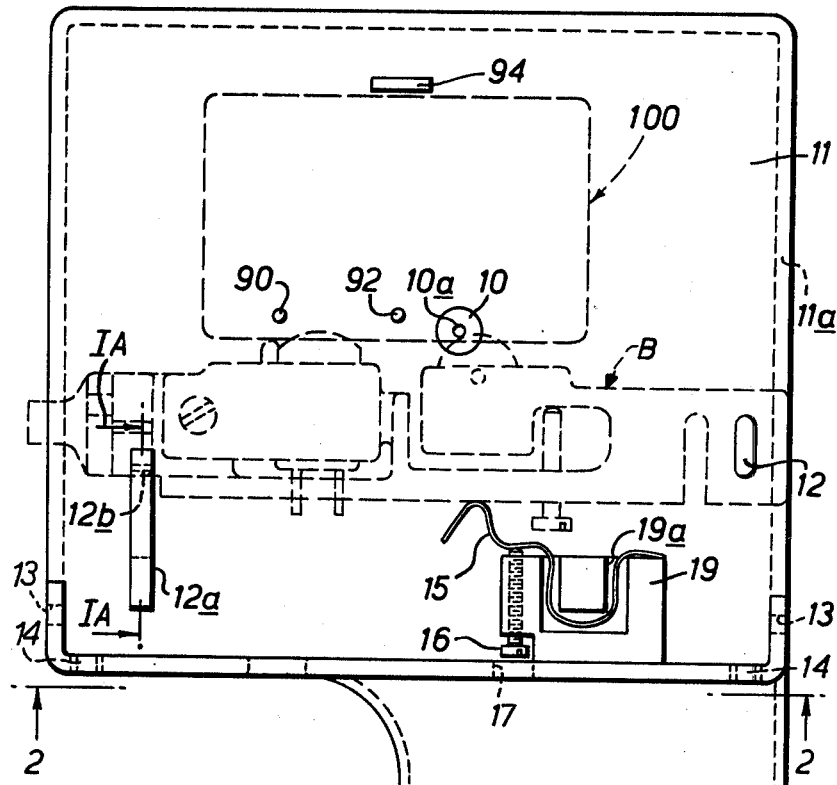

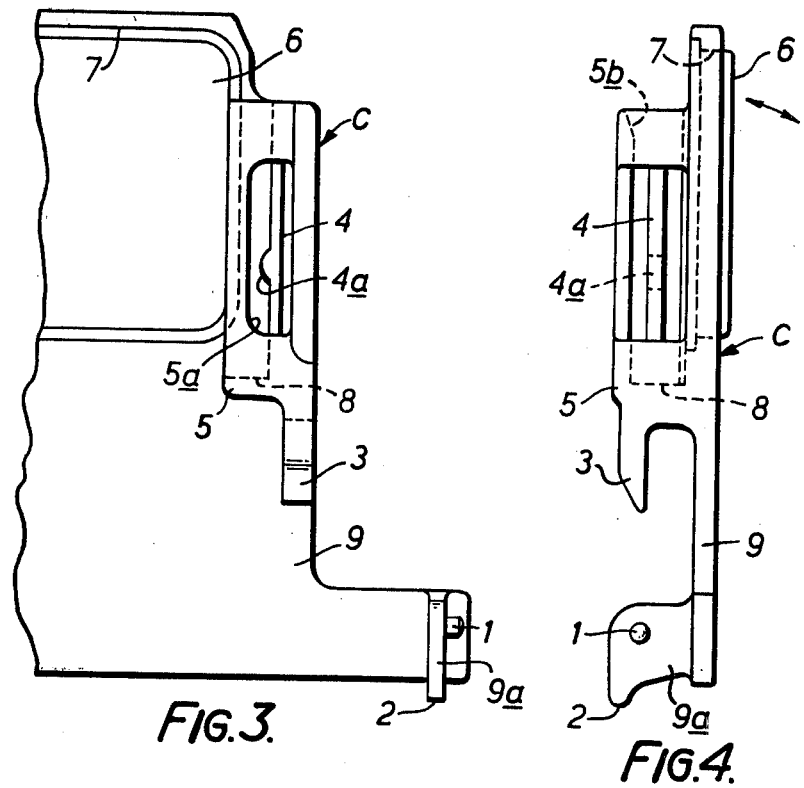
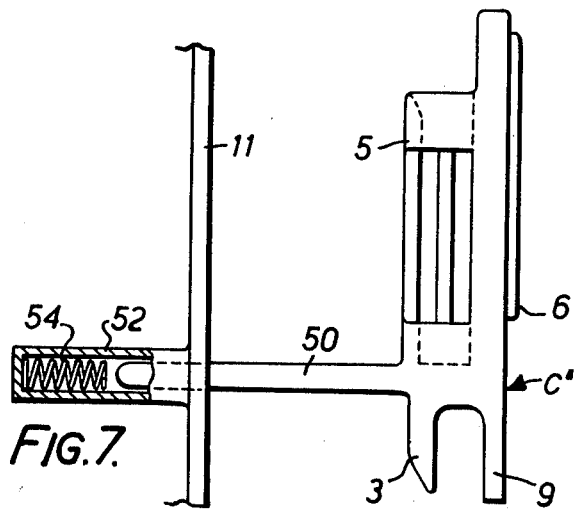

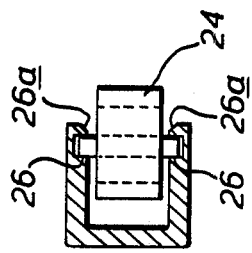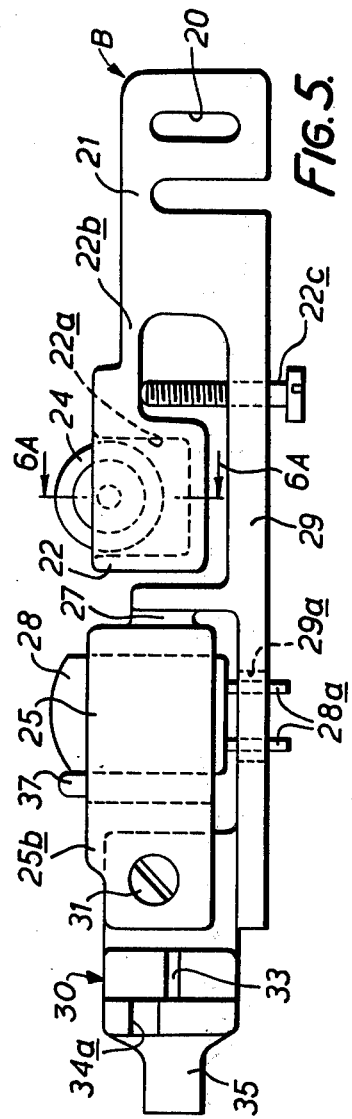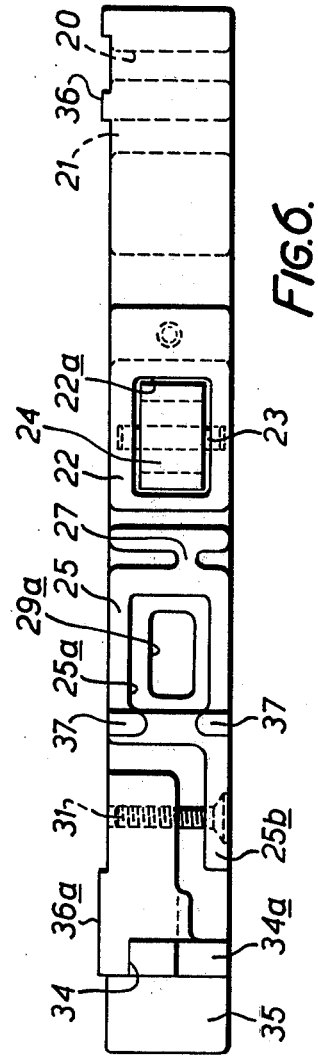

PLAYER FOR TAPE CARTRIDGES AND CASSETTES

STATEMENT OF THE INVENTION

This invention relates to a tape transport machine for feeding the tape of a tape cartridge or tape cassette and to a bridge member for such a machine. The invention has particular application to a play-back machine for receiving cartridges or cassettes loaded with magnetic tape for playing back an audio recording present on that tape. The invention also has application to a machine which is able instead or additionally to receive a tape cartridge or cassette and make an audio recording onto the tape of that cartridge or cassette.

SUMMARY OF THE INVENTION

This invention provides a bridge member for a tape transport machine, said bridge member comprising a piece of synthetic plastic material including first and second portions and a first resilient hinge which flexibly unites said first and second portions, the first portion being formed for mounting on a tape deck of said machine so as to be restrained against movement whilst said second portion is able to move arcuately across said deck by flexing about said first hinge, said second portion being formed to carry a magnetic sensing head.

In an embodiment to be described herein, the piece of synthetic plastic material of the bridge member includes third and fourth portions flexibly united to said second portion by second and third hinges, the third and fourth portions receiving, respectively, the sensing head and a freely rotatable wheel for pressing the tape of a cartridge or cassette against a drive capstan for the machine. An adjusting means is provided for each of the third and fourth portions, for adjusting the position of the third portion so as to adjust the angle of the sensing head relative to the plane of the tape deck and for adjusting the position of the fourth portion to move the wheel towards or away from the drive capstan.

This invention also provides a tape transport machine comprising a tape deck and a bridge member as defined in the last-but-one preceding paragraph, said bridge member being mounted by said first portion thereof upon said tape deck with said second portion able to move across said tape deck by flexing about said first hinge.

BRIEF DESCRIPTION OF THE FIGURES

An embodiment of the invention will now be described, by way of example only, with reference to the accompanying drawings, in which:

FIG. 1 is a plan view of a tape deck of an audio play-back machine with a cartridge carrier of the machine which forms a lid to the machine, and certain other components removed in order to show details of the tape deck;

FIG. 1A is a partial section along the line IA—IA of FIG. 1;

FIG. 2 is a section on the line 2—2 of FIG. 1;

FIG. 3 is an underneath view of a lateral region of the lid or cartridge carrier of the machine;

FIG. 4 is a side elevation of the carrier shown in FIG. 3;

FIG. 5 is a plan view of a bridge member of the machine, carrying a pinch wheel and a sensing head;

FIG. 6 is a front view of the bridge member shown in FIG. 5;

FIG. 6A is a section on the line 6A—6A of FIG. 6, showing the pinch wheel;

FIG. 7 is a side view, partly in section, of a modified tape deck with the cartridge carrier assembled thereto.

DETAILED DESCRIPTION

Referring to FIGS. 1 and 2 of the drawings, there is shown a tape deck of a tape play-back machine, comprising a one-piece moulding of synthetic plastic material such as acetal. This moulding includes a flat rectangular deck 11 and wall 11a extending the full periphery below the deck and along the rear and short lateral portions above the deck. A bearing member insert 10 is provided in a centre region of the deck, insert 10 having a through-bore 10a for accommodating a drive capstan (not shown) extending from a drive mechanism beneath the deck 11. The upper end of the capstan will project from the upper surface of the deck to project into a tape cartridge or cassette when the latter is inserted and moved to the "play" position, to be described later in this specification.

A generally rectangular-section post 12 is integral with and projects from the upper surface of the deck 11 to locate one end of a pinch wheel/sensing head bridge member B. This bridge member is shown in outline in FIG. 1 but will be described in detail later in this specification with reference to FIGS. 5 and 6. Also integral with and projecting from the upper surface of the deck 11 adjacent the rear thereof is a formation 19 having a U-shape channel 19a in which is located a metal spring 15, shaped as shown. This spring is intended to provide, at its free end, mechanical bias for the bridge member mentioned above (when located by the post 12). The bias may be pre-set by a bolt 16 threaded through the formation 19, the head of the bolt being accessible from the exterior of the deck part, at the rear thereof, through an aperture 17 in the peripheral wall 11a, the other end of the bolt 16 bearing on the spring 15 at a point towards the free end of the latter. The deck 11 also has integral therewith and projecting from the upper surface a detent member 12a more clearly shown in FIG. 1A. A tooth 12b projects downwardly from the under-surface of a bridge portion 12c which extends forwardly from a post 12d of the member 12a and which is spaced upwardly from the deck upper surface. The detent is intended for co-operating with the bridge member, as will be described later in this specification.

On opposite sides of the deck, adjacent the rear thereof, the portions of the wall 11a projecting above the deck 11 are formed with aligned bores 13 for receiving pivot pins integral with and projecting from the cartridge carrier C which is to be described with reference to FIGS. 3 and 4. The peripheral wall 11a is further formed on the rear adjacent the opposite sides of the deck part with U-shaped cut-outs leaving resilient tongues 14. These are intended to co-operate with projecting spurs on the lid part to bias the lid part to an open position relative to the tape deck.

The one-piece moulding which provides the tape deck may be provided with an extension 11b from the rear thereof, for mounting a motor 10b on the underside of the extension. This motor is intended for driving the drive capstan of the machine.

Referring now to FIGS. 3 and 4, there is shown the cartridge carrier which forms also a lid of the machine. This carrier comprises a one-piece moulding of synthetic plastic material such as acetal and includes a flat rectangular portion 9 provided with a cut-out 7 into which a transparent window 6 is inserted, in order to enable indicia on the cartridge (not shown) to be visible whilst the machine is playing. Adjacent its rear edge, the flat rectangular portion 9 of the carrier has, integral therewith and projecting downwardly therefrom, a pair of formations 9a (only one of which is shown) adjacent opposite side edges of the lid part. These formations have oppositely extending pivot pins 1 for snap-engaging with the bores 13 in the wall 11a of the tape deck to provide pivoting action between deck and carrier. Also the formations 9a have rearwardly extending spurs 2 for co-operating with the resilient tongues 14 on the wall 11a of the tape deck to bias the carrier to an open position relative to the tape deck.

Adjacent its side edges and towards the front, the flat rectangular portion 9 of the carrier is formed on its lower surface with two integral channel-shaped portions 5 (only one of which is shown). The channels facing each other in order to embrace the opposite edge portions are provided with an elongate cut-out 5a on their lowermost limbs and with two elongate cut-outs on their side limbs which leave a strip 4 which is provided with an inwardly-facing rounded projection 4a. The projections 4a serve to apply a degree of pressure to the opposite sides of the cartridge to hold it firmly against sideways movement. Sliding movement of the cartridge into the channels 5 is limited by a stop portion 8 at the rear ends of the channel portion 5. The channel portions have sufficient inherent resilience also to hold the cartridge firmly up against the under surface of the flat portion 9 of the lid part. One of the channel portions has a rearwardly projecting catch portion 3 for co-operating with the pinch wheel/sensing head bridge member B in a manner to be described later in this specification. The channel portions 5 have flared entrances, as shown at 5b, for easing entry of the cartridge by a sliding movement. Preferably the channel portions 5 formed so as to co-operate with the cartridge in such a manner that the cartridge can only be accepted the correct way up. Thus for example, the cartridge may be formed with a bevel on its upper side along opposite edges thereof, but without any such bevel on its lower side.

Referring now to FIGS. 5 and 6, there is shown the pinch wheel/sensing head bridge member B, also comprising a one-piece moulding of synthetic plastic material such as acetal. The bridge member is provided adjacent one end with a first extension portion that contains a through-aperture 20, elongate in cross-section and corresponding to the post 12 which projects from the upper surface of the tape deck 11. The bridge member is intended to be secured in position on the deck 11 by being a push-fit over the post 12, securing this end of the bridge member against rotation. This end of the bridge member is provided with an annular projection 36 for resting on the deck 11, keeping the remainder of the bridge member just above the deck 11 apart from a corresponding projection 36a adjacent the opposite end of the bridge member, which also rests on the deck 11.

The bridge member is reduced in width adjacent the end through which aperture 20 is formed, in order to provide a hinge 21 for pivoting the remainder of the bridge member across the upper surface of the deck about a vertical axis. The hinge 21 may itself be sufficiently resilient to provide the mechanical bias which is required but in the embodiment shown this bias is supplemented by the metal spring 15 previously described with reference to FIG. 1.

The one-piece moulding of the bridge member includes a portion 22 provided with a recess 22a in a front face of the bridge member, this recess housing a pinch wheel 24 which is carried by a spindle 23. Opposite ends of the spindle 23 are located in detents 26, 26 in the bridge member portion 22 and preferably, as shown particularly in FIG. 6A, the spindle is snap-engageable into these detents, the detents including appropriate cam surfaces 26a. The spindle axis is located close to the front of the bridge member so that the pinch wheel projects appreciably in order to project through an aperture in the forward edge of the cartridge and to press the tape within the cartridge against the drive capstan which projects upwardly from the deck 11 and through an aperture in the bottom of the cartridge. It will be noted that the portion 22 into which the pinch wheel is fitted is joined to the remainder of the bridge member through a reduced thickness of synthetic plastic material at 22b providing a hinge for movement of the pinch wheel towards and away from the cartridge, parallel to the surface of the tape deck. Adjustment is effected against the bias of the hinge by a bolt 22c which is threaded into a rigid rear portion 29 of the bridge member and which bears against a rear surface of the portion 22.

A sensing head 28 (shown in FIG. 5 but removed from the bridge member in FIG. 6) is housed within a portion 25 of the bridge member which is pivotable at hinge 27 relative to the rear portion 29 of the bridge member. The sensing head portion 25 is generally rectangular insection, as viewed in FIG. 6, with a rectangular-section recess 25a in which the sensing head is a press-fit, and has a flat projecting portion 25b adjacent the top of the bridge member. As shown in FIG. 5, the portion 25 extends for less than the full width of the bridge member and the hinge 27 is confined to a region of the portion 25 remote from the front edge of the bridge member. As shown in FIG. 6, the hinge 27 is confined also to a region approaching the top of the bridge member, the hinge permitting pivoting of the portion 25 around a horizontal axis transverse to the bridge member. The bridge member includes a head portion 30 extending from the portion 29 and partly underlying the projecting portion 25b of the hinged portion 25. This head portion includes a projecting finger 35 for manual movement of the bridge member. A bolt 31 extends through a bore in the portion 25b and is threaded into the head portion 30 to enable adjustment of the portion 25 about the hinge 27, and hence enables arcuate adjustment of the sensing head 28 relative to the plane of the deck to align it with the tape path in the tape cartridge. Two guides 37 are formed on the bridge at a spacing equal to the width of the tape to guide the latter at the correct height for the head.

The recess 25a in which the sensing head 28 is housed extends the full width of the hinged portion 25 so that the contacts 28a, 28a of the sensing head may project rearwardly. An aperture 29a is formed in the elongate rear portion 29 to further accommodate these contacts.

A tooth 33 is formed on the upper surface of the head portion 30 adjacent the finger 35, for co-operating with the tooth 12b of the detent member 12a which projects from the upper surface of the deck 11 (see FIG. 1A). Also a recess 34 is provided extending into the head portion 30 from the front edge of the bridge member, recess 34 having a cam surface 34a at its entrance and being intended to co-operate with the catch 3 provided on the cartridge carrier (see FIG. 4).

In use of the machine, the bridge member is retracted manually against its mechanical bias to be retained in the retracted position by engagement of teeth 12b and 33. The cartridge is then slid into the open cartridge carrier until the cartridge abuts the stops 8 the channel portions 5 themselves urging the cartridge firmly against the flat portion 9 of the carrier. The carrier is then manually closed down onto the deck against the mechanical bias of the resilient tongues 14, and towards the end of this closure movement the catch 3 on the carrier cams on the surface 34a of the bridge member to latch into the recess 34 of the latter. This retains the carrier in the closed position, and the bridge member is manually moved forward to free it from the abutting teeth 12b and 33 and then the mechanical bias on the bridge member urges the pinch wheel onto the tape in the cartridge and against the drive capstan which will have entered the cartridge as the carrier is closed. This forward movement of the bridge member is arranged to close an electrical contact (not shown) in order to energize the sensing head and the motor for the drive capstan.

In order to remove the cartridge after it has been played, the bridge member is retracted manually, firstly opening the electrical contact to de-energize the sensing head and drive motor, and then releasing the catch 3, 34 so that the lid part will open to enable the cartridge to be removed. Also the teeth 12b and 33 will engage to retain the bridge member in its retracted position.

A projecting boss and lug (not shown) may be formed on the upper side of the deck 11 to support a flexible circuit board in alignment with the contacts 28a of the sensing head. This enables a welding interconnection to be made automatically by lowering a welding head towards the deck along a preset path, saving an individual manual operation which is time consuming. This technique may be used also for other electrical connections in the product.

In a modification of the machine which has been described with reference to FIGS. 1 to 6, the cartridge carrier is mounted for sliding movement along a line perpendicular to its own plane towards and away from the tape deck, instead of being mounted for pivoting movement. Referring to FIG. 7, in which this modification is diagramatically illustrated, the carrier C' is identical with the carrier C shown in FIGS. 3 and 4 except that the formation 9a are replaced with a pair of posts 50 (only one of which can be seen in FIG. 7) which project at right angles from the carrier and which slide into respective tubes 52 mounted under the tape deck at right angles to the latter. Each tube 52 is provided with a coil spring 54 to bias the carrier towards its open position, spaced above the tape deck, in which it is able to receive the cartridge. The catch 3 is able to operate in the same manner as in the machine shown in FIGS. 1 to 6.

The machine which has been described is concerned particularly with receiving a cartridge of miniature dimensions, for example the "mini"-cartridge described in my U.S. application Ser. No. 618,286 filed Sept. 30, 1975.

It will be noted that each of the hinges 21, 22b and 27 is relatively wide so that each hinge is stiff in all directions except the required direction of flexing.

Preferably bosses 90, 92 are moulded onto the deck to engage apertures in the cartridge or cassette (shown in outline at 100 in FIG. 1). The bosses include enlarged heads for the cartridge to engage beneath, a resilient tongue being provided at 94 to push the cartridge towards the bridge to engage beneath these heads. The bosses accordingly act as references for the positioning of the cartridge.

What we claim is:

1. Tape transport apparatus, comprising:
    a. a tape deck (11) including means for receiving a tape module containing a length of tape;
    b. a unitary elongate bridge member (B) formed of synthetic plastic material, said bridge member comprising a main body portion, and a first extension portion hingedly connected with one end of said main body portion by a first resilient hinge portion (21), said bridge member being disposed on the tape deck with said extension rigidly connected with the tape deck, said first resilient hinge having a pivot axis normal to said tape deck so that the main body of the bridge member is movable in an arc across the tape deck; and
    c. a magnetic sensing head (28) carried by said main body portion of the bridge member.

2. Apparatus as defined in claim 1, wherein said bridge member includes a second extension portion (25) from said main body portion, said second extension portion being hingedly connected with said main body portion by a second resilient hinge portion (27), said second resilient hinge portion having a pivot axis parallel to the tape deck but normal to the length of said bridge member, said sensing head (28) being mounted on said second extension portion so as to be carried by said main body portion, and means (31) for moving said second extension portion relative to said main body by flexing said second hinge so as to adjust the angle, relative to the plane of the tape deck, at which the sensing head will lie.

3. Apparatus as defined in claim 2, wherein said adjusting means includes a bolt (31) arranged to close a gap, upon tightening, between said second extension portion and said main body portion against the resilience of said second hinge.

4. Apparatus as defined in claim 1, wherein said bridge member includes a third extension portion (22) hingedly connected with said main body portion by a third resilient hinge portion (22b), said third resilient hinge portion having a pivot axis normal to said tape deck, means (22c) for moving said third extension portion relative to said main body portion by flexing said third hinge portion, and a pinch wheel (24) mounted on said third extension portion for free rotation about an axis perpendicular to said tape deck.

5. Apparatus as defined in claim 4, wherein said adjusting means for said pinch wheel includes a bolt (22c) arranged to open a gap, upon tightening, between said third extension portion and said main body portion against the resilience of said third hinge portion.

6. Apparatus as defined in claim 4, and further including a spindle (23) on which said pinch wheel is rotatably mounted, and wherein said third extension portion is provided with formations (26) with which opposite ends of said spindle are in snap-fit engagement.

7. Apparatus as defined in claim 1, wherein said first extension portion is provided with a slot (20), said tape deck being provided with a peg projecting from said tape deck and extending in engagement within said slot.

8. Apparatus as defined in claim 1, and further including a spring (15) for urging the main body portion of said bridge member across said tape deck in a direction toward said tape module receiving means.

9. Apparatus as defined in claim 8, and further including means defining a catch (3) for retaining said bridge in a retracted position away from said tape module receiving means against the biasing force of said first hinge portion and of said spring.

10. Apparatus as defined in claim 8, and further including means defining a catch for retaining said bridge member in a retracted position away from said tape module receiving means against the biasing force of said first hinge portion and of said spring, said bridge member including a projection (35) extending from the end opposite said first extension, thereby to permit gripping of the bridge member by hand for displacement to free it from said catch.

11. Apparatus as defined in claim 1, and further including a carrier member (C) for receiving the tape module, said carrier member being movable from an open position to a closed position relative to said tape deck so as to mount said module upon said tape deck.

12. Apparatus as defined in claim 11, and further including means (14) for resiliently biassing said carrier member toward its open position away from said tape deck, and latch means automatically engaged upon closing said carrier to said tape deck to hold said carrier in the closed position.

13. Apparatus as defined in claim 11, and further including means for resiliently biassing said carrier member toward its open position away from said tape deck, and latch means automatically engaged upon closing said carrier member to hold said carrier member in the closed position, said latch means including cooperating parts on said bridge and carrier members, and means for releasing said latch means upon manual movement of said bridge member toward said retracted position.

14. Apparatus as defined in claim 11, wherein said carrier member is connected with said tape deck for sliding movement along a line normal to its own plane for movement toward and away from said tape deck, respectively.

* * * * *